United States Patent [19]

Sjöström et al.

[11] Patent Number: 5,029,929
[45] Date of Patent: Jul. 9, 1991

[54] BED ARRANGEMENT IN THE COUPE AREA OF A VEHICLE

[75] Inventors: Staffan Sjöström, Grödinge; Rolf Johansson, Trosa, both of Sweden

[73] Assignee: Saab-Scania Aktiebolag, Sweden

[21] Appl. No.: 480,027

[22] Filed: Feb. 14, 1990

[30] Foreign Application Priority Data

Feb. 15, 1989 [SE] Sweden ................. 8900505

[51] Int. Cl.⁵ ............................... B60W 2/32
[52] U.S. Cl. .................... 296/69; 296/190; 297/124; 297/63; 5/118
[58] Field of Search ............ 296/69, 190; 297/124, 297/125, 63, 369; 5/118

[56] References Cited

U.S. PATENT DOCUMENTS

| | | | |
|---|---|---|---|
| 491,602 | 2/1893 | Schulte | 297/124 |
| 3,058,148 | 10/1962 | Beierbach et al. | 297/369 |
| 3,097,881 | 7/1963 | Aguilar | 296/69 X |
| 3,374,032 | 3/1968 | Giudice | 297/124 X |
| 3,588,168 | 6/1971 | Froitzheim | 296/190 |
| 3,866,270 | 2/1975 | Suzuki et al. | 297/369 X |
| 4,106,809 | 8/1978 | Minka | 297/63 X |
| 4,215,899 | 8/1980 | Schmidt et al. | 5/118 X |
| 4,343,508 | 8/1982 | Heling et al. | 296/69 X |
| 4,620,335 | 11/1986 | Dodgen | 296/69 X |

FOREIGN PATENT DOCUMENTS

| | | | |
|---|---|---|---|
| 0036758 | 9/1981 | European Pat. Off. | |
| 515873 | 1/1931 | Fed. Rep. of Germany | 5/118 |
| 2604958 | 4/1988 | France | 296/69 |
| 539731 | 2/1956 | Italy | 296/69 |
| 592417 | 4/1959 | Italy | 296/69 |
| 1037730 | 8/1966 | United Kingdom | 296/190 |
| 1135725 | 12/1968 | United Kingdom | 296/190 |

Primary Examiner—Margaret A. Focarino
Assistant Examiner—Joseph D. Pape
Attorney, Agent, or Firm—Ostrolenk, Faber, Gerb & Soffen

[57] ABSTRACT

A vehicle seat (8) comprises a backrest (7) which consists of an upper and a lower backrest part (14,15). The lower backrest part (15) is connected in an articulated manner both to a seat part (9) and to the upper backrest part (14). By swinging the lower backrest part (15) forwards in the longitudinal direction of the vehicle and the upper backrest part (14) backwards in the longitudinal direction, the vehicle seat (8) is converted into part of a bed.

19 Claims, 2 Drawing Sheets

BED ARRANGEMENT IN THE COUPE AREA OF A VEHICLE

BACKGROUND OF THE INVENTION

The present invention relates to a bed arrangement in the coupé area or the area at and behind the driver's seat, of a vehicle, comprising vehicle seats which can be converted into a bed and which each comprise a seat part and a backrest connected to the latter.

The maximum length of a lorry with trailer is limited by law. In order to obtain as great a loading length as possible within the limited length, developments are moving in the direction of ever shorter cabs. However, as the cabs are being made shorter, the space in the cab which can be used for a bed, on which the lorry driver can rest between his work shifts, is also reduced.

Since there is less and less space for a bed in the cab, greater requirements are placed on the designing of the bed, since the latter must, on the one hand, be sufficiently wide to allow the driver to take up a comfortable rest position and must, on the other hand, be designed in such a way that it does not limit the driver's freedom of movement during his work shift.

European Patent Application EP 36758 discloses a relatively compact bed arrangement. The arrangement comprises three bed cushions, of which one bed cushion is pivotably arranged between an upper and a lower position on the rear wall of the cab, while the two other bed cushions are arranged on the rear side of the backrests of the driver's seat and the passenger seat respectively. The bed cushions are arranged so that they form an integral bed when the backrests of the seats are folded forwards towards the instrument panel of the vehicle and at the same time the bed cushion arranged on the rear wall of the cab is in its lowered position.

The bed arrangement is certainly relatively compact and saves space, but it has a number of disadvantages. First, the bed cushions on the backrests limit the adjustment range of the seats. The limitation of the adjustment range is particularly noticeable in the case of the passenger seat since, for reasons of comfort, the latter should be displaceable in the longitudinal direction over a greater distance than the driver's seat is displaceable, and since its backrest, again for reasons of comfort, should be pivotable backwards to a greater degree than the backrest of the driver's seat.

Second, it is difficult to use the bed arrangement in so-called cab-over-engine vehicles. Indeed, in these, an engine cowl covering the engine protrudes into the coupé area. Therefore, in order to use the bed arrangement, it is necessary for the seat parts of the seats to be raised, each time the bed arrangement is used, from a previously adjusted position, suitable from a driving and comfort point of view, to a relatively high position in which the integral bed is able to extend over the engine cowl. Thereafter, when the bed is converted into vehicle seats, it is once again necessary to find the suitable vertical position for the seats.

SUMMARY OF THE INVENTION

The aim of the present invention is to eliminate the abovementioned disadvantages. To this end, the invention is characterized in that the backrest comprises an upper and a lower backrest part, in which respect the lower backrest part is connected in an articulated manner to the seat part via a first articulation member, and is connected in an articulated manner to the upper backrest part via a second articulation member, in that the second articulation member is designed to permit pivoting of the upper backrest part relative to the lower backrest part between a first position, in which the backrest parts are essentially in line with each other and form an integral backrest, and a second essentially horizontal position, in which the upper backrest part constitutes part of the bed, and in that the second articulation member comprises at least one locking member for securing the position of the backrest parts relative to each other in at least the first position.

The arrangement according to the invention allows the driver to take up a comfortable rest position and is designed in such a way that it does not limit the driver's freedom of movement during his work shift. When using the arrangement, there is no need for bed cushions or the like, which limit the adjustment range of the vehicle seats. In addition, since the articulation member between the two backrest parts is situated relatively high in the backrest, it is also possible to convert the vehicle seats into a bed without changing a previously adjusted position, suitable from a driving and comfort point of view, in order to ensure that the bed extends over the engine cowl covering the engine in cab-over-engine vehicles.

In an advantageous embodiment of the invention, when the vehicle seats are converted to a bed, the lower backrest part is swung forwards in the longitudinal direction of the vehicle by means of the first articulation member, and at the same time the upper backrest part is swung backwards in the longitudinal direction of the vehicle by means of the second articulation member.

Since the lower backrest part is folded forwards when the upper backrest part is folded backwards, on account of the resulting bed of Z-shaped profile, an extremely stable bed arrangement is obtained. In addition, again on account of the Z-shape, it is possible to move the vehicle seats relatively far backwards in the coupé area before they are converted into a bed. This results in a relatively large space in front of the bed, which increases comfort in the coupé area when the bed is being used.

BRIEF DESCRIPTION OF THE DRAWINGS

Other features characterizing the invention will emerge from the subsequent patent claims and from the following description of an embodiment illustrating the invention. In the description, reference is made to the attached figures, of which

DESCRIPTION OF THE PREFERRED EMBODIMENTS

Figure 1:
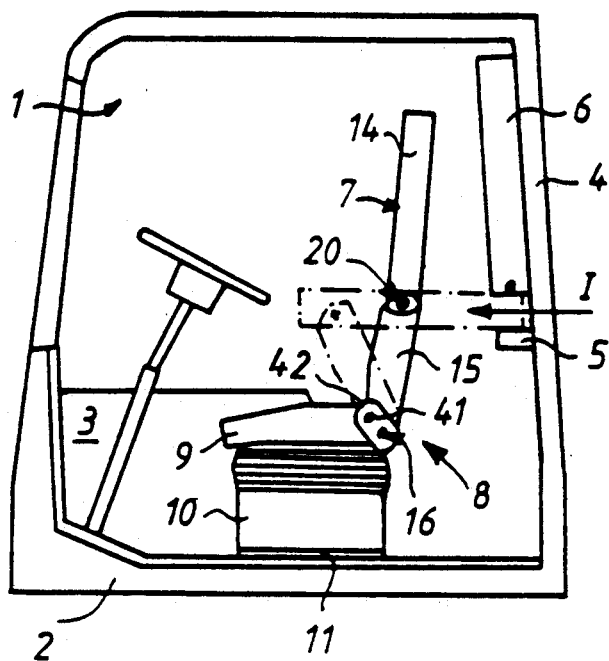
FIG. 1 shows a diagrammatic side view of a vehicle cab equipped with a bed arrangement according to the invention.
Figure 2:
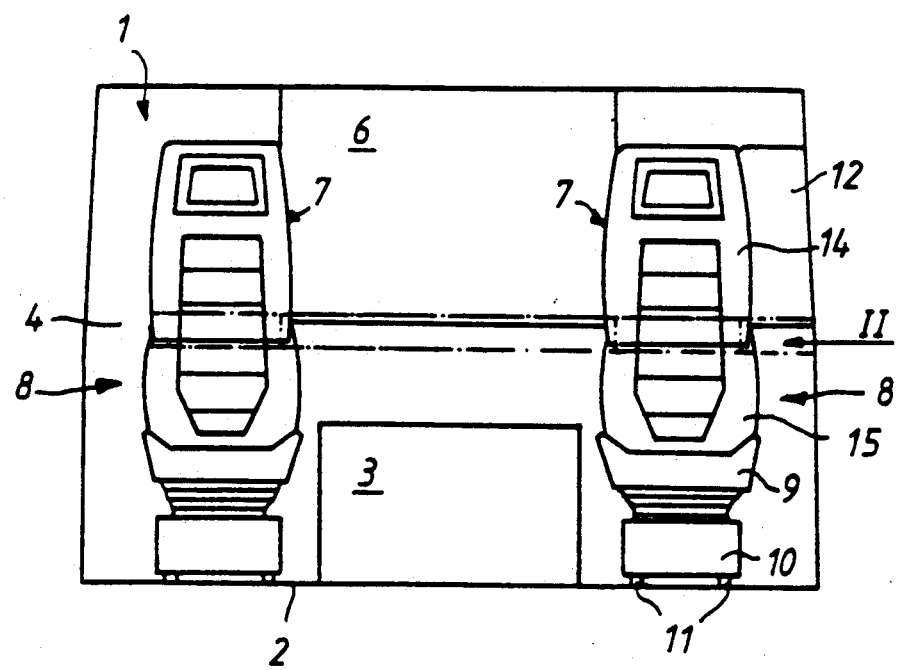
FIG. 2 shows a front view of the arrangement according to the invention.

In FIGS. 1 and 2, the coupé area 1 of a vehicle cab is shown diagrammatically. The vehicle cab is arranged on top of a conventional framework (not shown) which constitutes part of a vehicle chassis. The cab is provided with a cab floor 2 which separates the coupé area 1 from the vehicle chassis. The cab floor 2, which is designed with an engine cowl 3 projecting into the coupé area 1 and covering a drive unit (not shown) attached to the framework, is connected at its rear to a vertical cab wall 4 which delimits the coupé area 1 to the rear.

A board-shaped member, which will be referred to hereinafter as the bed cushion 6, is arranged transversely in the coupé area 1. The bed cushion 6 is pivotably arranged on the cab wall 4 between a vertical stowing position and an essentially horizontal position in which it constitutes part of a bed. In the horizontal position, the bed cushion 6 passes in between the backrests 7 of two vehicle seats 8 situated close to each other. In FIGS. 1 and 2, the bed cushion 6 is shown by full lines in the vertical position, whereas in FIG. 2 it is shown with dot-and-dash lines in the horizontal position.

Furthermore, on the cab wall 4 behind each vehicle seat 8, there is arranged at least one support part 5 whose function will be described further below.

The two vehicle seats 8 are identical from the standpoint of the invention. Therefore, only the one vehicle seat is described below, it being understood that the description also applies to the other vehicle seat.

The vehicle seat 8 also comprises, in addition to the backrest 7, a seat part 9. The seat part 9 is connected to a seat support 10 which bears displaceably on two elongate parallel rails 11 in the cab floor 2. Between the seat support 10 and the rails 11, a conventional, and therefore not shown, locking mechanism is designed to releasably lock the position of the vehicle seat 8 along the rails 11.

The backrest 7 comprises an upper and a lower backrest part 14, 15. The lower backrest part 15 is connected in an articulated manner to the seat part 9, via a first articulation member 16 extending in the transverse direction of the vehicle, in order to make it possible to fold the backrest 7 forwards or backwards in the longitudinal direction of the vehicle around the axis defined by the member 16 once an actuable locking member has been activated. The first articulation member 16 and its locking member do not constitute part of the present invention and are therefore not described in greater detail.

The lower backrest part 15 is connected in an articulated manner to the upper backrest part 14 via a second articulation member 20. The articulation member 20, which is arranged essentially parallel to the first articulation member 16, is designed to permit pivoting of the upper backrest part 14 relative to the lower backrest part 15 around the axis defined by the articulation member 20 between a first position, in which the backrest parts 14, 15 are essentially in line with each other and form an integral backrest 7, and a second essentially horizontal position in which the upper backrest part constitutes part of the bed.

Figure 3:
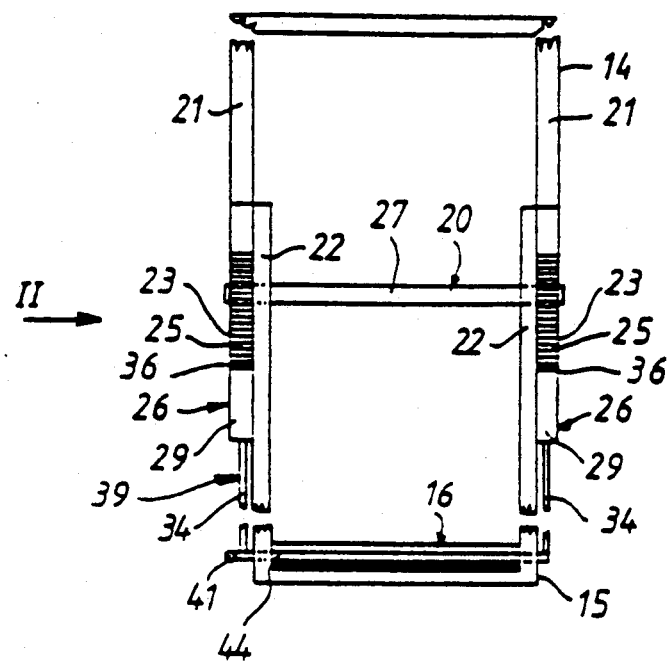
FIG. 3 shows a diagrammatic view I of the backrest shown in FIG. 1 when its cushions are removed.
Figure 4:
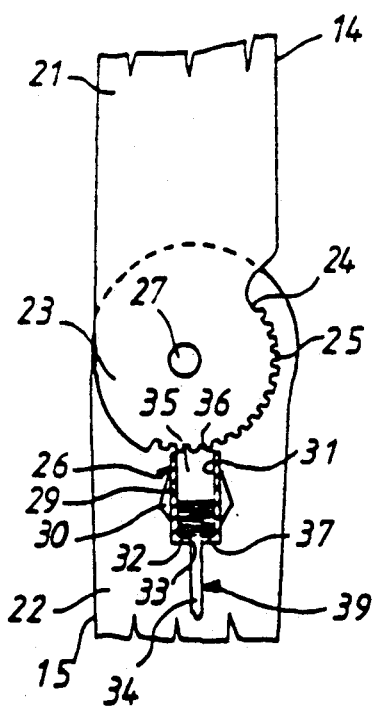
FIG. 4 shows a diagrammatic view II of the arrangement according to the invention shown in FIGS. 2 and 3, when the upper backrest part is in the vertical position.
Figure 5:
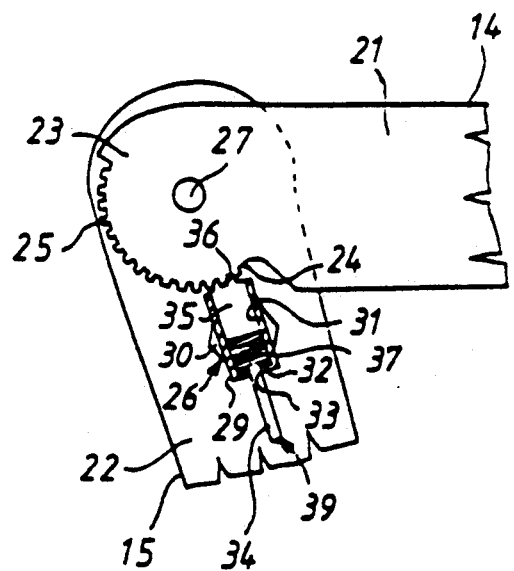
FIG. 5 shows a diagrammatic view II of the arrangement according to the invention shown in FIGS. 2 and 3, when the upper backrest part is in the horizontal position.

FIGS. 3 to 5 show diagrammatically the supporting parts of the backrest parts 14, 15 and the second articulation member 20 after the cushions of the backrest 7 have been removed. In the figures, only those details are shown which are of importance for an understanding of the invention.

The upper and lower backrest parts 14, 15 each comprise a U-shaped steel framework. The legs 21 of the steel framework of the upper backrest part partially overlap with the legs 22 of the steel framework of the lower backrest part and are, at their lower part 23, essentially of semicircular form around the axis of the articulation member 20. Along the periphery 24 of the semicircle, teeth 25 are arranged to co-operate with locking members 26 in order to secure the angular position between the backrest parts 14, 15 whose common point of rotation consists of a shaft 27 passing transversely through the vehicle seat 8 the shaft 27 defines the axis of the second articulation member 20. The two locking members 26 are identical from the standpoint of the invention, for which reason only the one locking member 26 is described below.

The locking member 26 consists of a housing 29 designed with flanges 30 through which screws (not shown) extend in order to attach the housing 29 to the leg 22 of the lower backrest part 15. The housing 29 is designed with an internal channel 31 which, at one end, is designed with a gable wall 32 with a continuous hole 33, which constitutes a support surface for an elongate actuating member 34 which is connected (in a manner not shown) to a pin 35 arranged displaceably in the channel 31. The pin 35 is designed at one end with teeth 36, while its other end bears against a compression spring 37 which surrounds the elongate member 34 and bears against the gable wall 32 of the housing.

The compression spring 37 exerts a force on the pin 35, which force tends to displace the pin 35 out of the housing 29, in which respect the teeth 36 of the pin 35 are caused to co-operate with the teeth 25 on the semicircular periphery 24, in order to thereby secure the position of the backrest parts 14, 15 relative to each other.

The teeth 36 of the pin 35 are released from co-operation with the teeth 25 of the semicircular periphery 24 by means of manual actuation of a release mechanism 39 which comprises the previously mentioned elongate member 34, whose one end is connected to the pin 35 and whose other end is designed with a ball head 41 or the like and is accessible in the area of the join 42 between the lower backrest part 15 and the seat part 9.

In order to make it possible to actuate both locking members 26 with one single control, i.e. the ball head 41, the lower parts of the actuation members 34 are connected to each other via a shaft 44 passing transversely through the vehicle seat 8.

The solution according to the invention has the following function.

The adjustment of each vehicle seat from being a seating place to part of a bed is initiated by the locking member of the first articulation member 16 being actuated with one hand, and the backrest 7 then being folded forwards in the longitudinal direction of the vehicle. Thereafter, with the aid of the ball head 41, the elongate actuation member 34 is driven downwards in the longitudinal direction of the backrest 7. When the actuation member 34 is driven downwards, the pin 35 movable in the axial direction is displaced in such a way that co-operation between the teeth 36 of the pin 35 and the teeth 25 of the semicircular periphery 24 ceases.

When the locking co-operation between the teeth 36, 25 has ceased, the upper backrest part 14 is folded backwards in the longitudinal direction of the vehicle and takes up an essentially horizontal position, in which it bears against the support part 5 on the cab wall 4. When the upper backrest part 14 has taken up a horizontal position, the ball head 41 is released and the compression spring 37 displaces the pin 35 towards the semicircular periphery 24 and, thereafter, the teeth 36, 25 are brought back into locking co-operation with each other.

After the backrests 7 of the vehicle seats 8 have been converted to parts of a bed, the bed cushion 6 pivotably arranged on the cab wall 4 is pivoted from the vertical stowing position to an essentially horizontal position between the vehicle seats 8 and forms, together with the upper backrest parts 14, an integral bed.

The invention should not be regarded as being limited by the described embodiment, but can be modified within the scope of the subsequent patent claims in a number of alternative embodiments.

With the exemplary embodiment described, it is possible to secure the backrest parts in any arbitrary angular position relative to each other. However, it is also possible, without departing from the inventive concept, to design the locking member in such a way that it only secures the angular position between the parts when these are essentially in line with each other and form an integral backrest.

In order to obtain a bed which is essentially as long as the cab is wide, it is possible to complete the described bed arrangement with one or more board-shaped bed cushions. An example of this is shown in FIG. 2. A relatively short bed cushion 12 is pivotably arranged on the cab wall between a vertical stowing position and an essentially horizontal position. In the horizontal position, the bed cushion passes in between the one vehicle seat and the side wall of the cab and constitutes an extension of the bed. It is of course possible to arrange a corresponding bed cushion for the other vehicle seat.

In the exemplary embodiment, bed cushions are used in combination with vehicle seats in order to obtain a sufficiently long bed. It is of course possible to position sufficiently wide vehicle seats close to each other so that these themselves form a sufficiently long bed.

In the exemplary embodiment described, two separate members are actuated in order to make it possible to swing the lower backrest part forwards in the longitudinal direction of the vehicle and the upper backrest part backwards in the longitudinal direction. It is of course possible to integrate the members with each other so that a single member is actuated in a first direction in order to swing the lower backrest part forwards, but is actuated in another direction in order to swing the lower backrest part backwards.

We claim:

1. Bed arrangement for the area of a vehicle at the vehicle seats, comprising:
    a vehicle seat including a seat part and a backrest connected to the seat part, the backrest extending upward from the seat part;
    the backrest comprising a lower backrest part connected to and extending up from the seat part, and an upper backrest part above the lower backrest part;
    backrest articulation means between the upper backrest part and the lower backrest part for permitting the upper part to pivot between a first seat position, wherein the backrest parts are essentially in line and extending upward to form a single seat backrest, and a second bed position, wherein the lower part remains generally upwardly extending while the upper part is spaced above the seat and oriented essentially horizontal for defining an essentially horizontal bed part; and
    locking means for locking the backrest parts relative to each other in at least the first position.

2. The bed arrangement of claim 1, further comprising seat articulation means between the seat and the lower backrest part for enabling the backrest to be articulated forwardly and rearwardly around the seat articulation means.

3. The bed arrangement of claim 2, wherein when the upper backrest part is articulated rearwardly to its second position around the backrest articulation means, the lower backrest part is pivoted forwardly at the seat articulation means.

4. The bed arrangement of claim 2, wherein both of the backrest articulation means and the seat articulation means define respective pivot axes, the axes are parallel and extend transversely to the longitudinal direction of the vehicle.

5. The bed arrangement of claim 1, wherein the upper backrest part is articulated rearwardly to its second position around the backrest articulation means.

6. The bed arrangement of claim 5, further comprising a support located in the vehicle rearwardly of the seat, the support being placed such that the upper backrest part rests against the support when the upper backrest part is in its second position.

7. The bed arrangement of claim 6, wherein the area of the vehicle behind the seat is defined by a rear wall in the vehicle which is spaced rearwardly from the seat, and the support being disposed on the rear wall.

8. The bed arrangement of claim 5, further comprising a bed cushion next to the seat, the bed cushion being foldable down to a position next to the seat to define, along with the upper backrest part of the seat, an integral bed surface extending across the vehicle, and the bed cushion being foldable up away from the seat.

9. The bed arrangement of claim 5, further comprising two of the seats located generally next to each other transverse to the longitudinal direction of the vehicle, and each seat being comprised of the backrest and of the backrest articulation means.

10. The bed arrangement of claim 9, further comprising a bed cushion next to at least one of the seats, the bed cushion being foldable down to a position next to the one seat to define, along with the upper backrest part of the one seat, an integral bed surface across the vehicle, and the bed cushion being foldable up away from the one seat.

11. The bed arrangement of claim 10, wherein the bed cushion is disposed and shaped as to be folded down in the space between the seats.

12. The bed arrangement of claim 11, further comprising the area of the vehicle in which the bed arrangement is provided being defined between opposite sidewalls of the vehicle;
    a second bed cushion being disposed between one of the seats and one of the sidewalls which define the area of the vehicle.

13. The bed arrangement of claim 9, further comprising a bed cushion located next to at least one of the seat, for defining along with the upper backrest part of the one seat, an integral bed surface extending across the vehicle.

14. The bed arrangement of claim 13, wherein the area of the vehicle behind the seat is defined by a rear wall of the vehicle which is spaced from the seat, and the bed cushion is pivotably attached to the rear wall of the vehicle part for being pivotable between an upright stowing position and a generally horizontal position, and in the horizontal position, the bed cushion cooperates with the upper backrest part of the seat to define the bed surface.

15. The bed arrangement of claim 1, wherein the locking means comprises a lockable element on one of the backrest parts and a locking member on the other backrest part, the locking member being moveable into engagement with the lockable element for locking the articulation orientation of the backrest elements with respect to each other; and an actuation member connected with the locking member and moveable for moving the locking member out of engagement with the lockable element for enabling articulation of the backrest parts.

16. The bed arrangement of claim 15, wherein the actuation member is elongated, the actuating member having one end connected to the locking member and the actuating member having an opposite end extending near to the area where the lower backrest part and the seat are joined at the seat articulation member.

17. The bed arrangement of claim 15, wherein the lockable element is formed on the upper backrest part and the locking member is disposed on the lower backrest part.

18. The bed arrangement of claim 17, wherein the lockable element comprises a circularly curved engageable end portion of the upper backrest part, and the end portion being curved around the axis of the backrest articulation means between the upper and the lower backrest parts;

the locking member comprises a part engageable with the curved end portion and comprises biasing means for biasing the locking member part against the curved end portion.

19. The bed arrangement of claim 1, wherein the backrest articulation means permits pivoting of the upper backrest part between the first seat position and the second bed position without changing the position of the seat part.

* * * * *